(12) United States Patent
Carrico

(10) Patent No.: US 11,876,668 B1
(45) Date of Patent: Jan. 16, 2024

(54) COMMUNICATION CHANNEL FAILOVER SYSTEM AND METHOD

(71) Applicant: The Anthem Companies, Inc., Indianapolis, IN (US)

(72) Inventor: Sandra Carrico, Mountain View, CA (US)

(73) Assignee: The Anthem Companies, Inc., Indianapolis, IN (US)

( * ) Notice: Subject to any disclaimer, the term of this patent is extended or adjusted under 35 U.S.C. 154(b) by 48 days.

(21) Appl. No.: 17/675,771

(22) Filed: Feb. 18, 2022

Related U.S. Application Data

(60) Provisional application No. 63/157,488, filed on Mar. 5, 2021.

(51) Int. Cl.
  *H04L 41/0663* (2022.01)
  *H04L 69/40* (2022.01)
  *H04L 41/0668* (2022.01)

(52) U.S. Cl.
  CPC ...... *H04L 41/0663* (2013.01); *H04L 41/0668* (2013.01); *H04L 69/40* (2013.01)

(58) Field of Classification Search
  None
  See application file for complete search history.

(56) References Cited

U.S. PATENT DOCUMENTS

| | | | | |
|---|---|---|---|---|
| 9,430,337 | B1 * | 8/2016 | Gupta | G06F 11/2033 |
| 10,445,197 | B1 * | 10/2019 | Harpreet | G06F 11/2023 |
| 2006/0126613 | A1 * | 6/2006 | Zweig | H04L 45/22 370/465 |
| 2019/0317869 | A1 * | 10/2019 | Selvaraj | G06F 11/203 |
| 2019/0342725 | A1 * | 11/2019 | Shirazi | H04L 51/56 |
| 2023/0070455 | A1 * | 3/2023 | Wang | H04L 67/51 |

* cited by examiner

*Primary Examiner* — Kenny S Lin
(74) *Attorney, Agent, or Firm* — Morgan, Lewis & Bockius LLP

(57) ABSTRACT

A system and method for communication channel failover between disparate communication providers. A communication application hosting server: while hosting a communication application between a first user device and a second user device: initiating establishing a first communication channel between the first user device and the second user device, wherein the first communication channel is provided by a first communication channel provider. The method further comprising, receiving a failure to connect signal from the first user; in response to receiving the failure to connect signal: determining whether a second communication channel provided by a second communication channel provider of a plurality of disparate communication channel providers meets a failover criteria. In response to determining that the second communication channel provided by the second communication channel provider meets failover criteria, redirecting the first user device and second user device to the second communication channel.

8 Claims, 5 Drawing Sheets

COMMUNICATION CHANNEL FAILOVER SYSTEM AND METHOD

CROSS-REFERENCE TO RELATED APPLICATIONS

This application claims the benefit of U.S. Provisional Patent Application No. 63/157,488 filed on Mar. 5, 2021 entitled "Communication Channel Failover System And Method", which is incorporated by reference in its entirety.

TECHNICAL FIELD

The disclosed implementations relate generally to telephony and video communications and more specifically to a method and system for communication channel failover between disparate communication providers.

BACKGROUND

While a number of web real-time communications (RTC) providers offer telephony and video communication services over the internet today, no single web RTC provider offers sufficiently reliable connectivity to a large subscriber base. However, if several communication channel providers could be configured for failover when one or several call participants have an issue, the reliability of the system would likely increase significantly. Managing the cutover from a first communication provider to a second communication channel provider is difficult to orchestrate.

SUMMARY

In some embodiments, there is a computer-implemented method of communication channel failover between disparate communication providers, the method comprising: at a communication application hosting server: while hosting a communication application between a first user at a first user device and a second user at a second user device: initiating establishing a first communication channel between the first user device and the second user device, wherein the first communication channel is provided by a first communication channel provider; wherein the first communication channel provider is one of a plurality of disparate communication channel providers; receiving a failure to connect signal from the first user; in response to receiving the failure to connect signal: for each of a plurality of disparate communication channel providers that provide additional communication channels to the communication application hosting server, determining whether a second communication channel provided by a second communication channel provider of the plurality of disparate communication channel providers meets a failover criteria; in response to determining that the second communication channel provided by the second communication channel provider meets the failover criteria, redirecting the first user device and the second user device to second communication channel provided by the second communication channel provider.

In some embodiments, the computer-implemented method including redirecting the first user device and the second user device to second communication channel provided by the second communication channel provider includes: connecting the first user device to the second communication channel by the communication application hosting server: confirming the first user device successfully connects to the second communication channel by receiving at least one of a real time indication from the second communication channel, an acceptance indication from the first user device, a successful connection test initiated by the communication application hosting server; and connecting the second user device to the second communication channel by the communication application hosting server.

In some embodiments, the failure to connect signal is detected by the communication application hosting server referencing a call log for the first user device, wherein the failure to connect signal is transmitted by the first user device.

In some embodiments, the failover criteria includes at least one of: a historical reliability metric, a cost metric, a latency metric, a specified preference user metric and a specified preference provider metric.

In some embodiments, the first user device has a unique first user identifier and the second user device has a unique second user identifier.

In some embodiments, the first user device and the second user device each have a unique connection identification for each communication channel.

In some embodiments, the communication application hosting server logs the failure to connect signal from the first user.

In some embodiments, there is a system for communication channel failover between disparate communication providers, comprising: one or more processors; memory; and one or more programs stored in the memory, wherein the one or more programs are configured for execution by the one or more processors and include instructions for: at a communication application hosting server: while hosting a communication application between a first user at a first user device and a second user at a second user device: initiating establishing a first communication channel between the first user device and the second user device, wherein the first communication channel is provided by a first communication channel provider; wherein the first communication channel provider is one of a plurality of disparate communication channel providers; receiving a failure to connect signal from the first user; in response to receiving the failure to connect signal: for each of a plurality of disparate communication channel providers that provide additional communication channels to the communication application hosting server, determining whether a second communication channel provided by a second communication channel provider of the plurality of disparate communication channel providers meets a failover criteria; in response to determining that the second communication channel provided by the second communication channel provider meets the failover criteria, redirecting the first user device and a second user to second communication channel provided by the second communication channel provider.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

DESCRIPTION OF IMPLEMENTATIONS

Figure 1A:
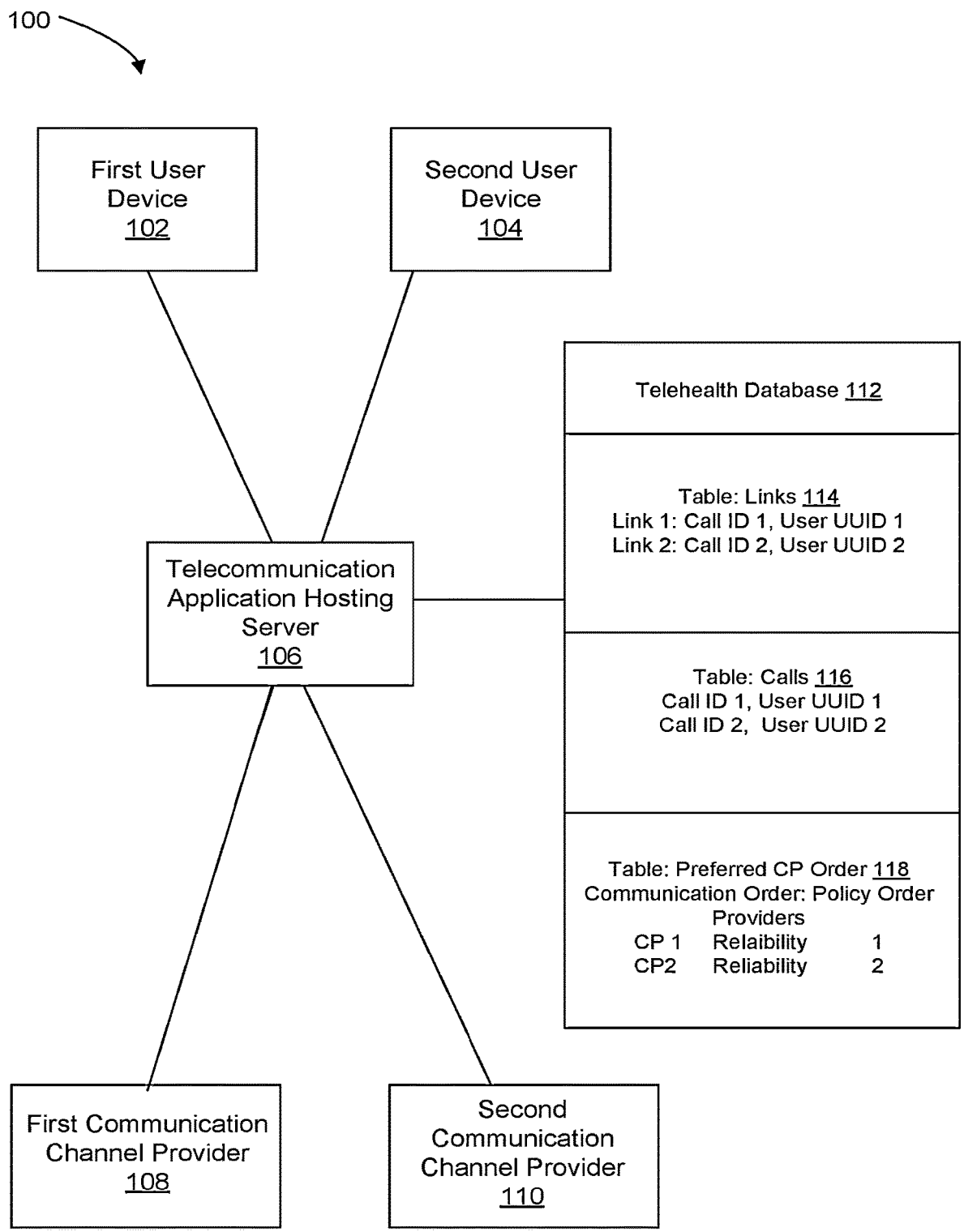
FIG. 1A is a communication channel system diagram, in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Because managing the cutover from a first communication channel provider to a second communication channel provider is difficult to orchestrate, there is a need for a method and system for increasing reliability and reducing costs of multi-way video conferences by failing over one or several participants across a plurality of communication channel providers. In some embodiments, upon successful connection of a user device to an alternative communication channel provider (CP), the other parties may use a variety of signaling mechanisms to follow the previously failing party to the working communications channel provider.

In some embodiments, a telehealth application may enable two or more individuals to communicate using any combination of audio, video, and data for medical purposes including, but not limited to, medical advice, consultation, diagnosis, and prescription writing. The parties in the communication (e.g., a call), may lack technical sophistication, adequate equipment, adequate data (e.g. internet) connectivity, adequate public switch telephone network (PSTN) connectivity, adequate edge equipment which may be used to improve such connections, adequate data center equipment, adequate telephony infrastructure including but not limited to bandwidth, base station capacity in the case of cellular base stations, adequate backhaul capability from a cellular base station to the PSTN, adequate satellite bandwidth in the case of satellite calls, adequate backhaul from the satellite to its connection to a terrestrial station, and/or adequate backhaul from the terrestrial station to the primary network. In these and other similar cases, the callers or participants attempting to communicate may find such communication difficult or impossible; however, each participant may be able to communicate if an alternative communication CP provided communication services such that all participants could all agree to use that communication CP (e.g., specific vendor). Dynamic orchestration amongst a plurality of communication CP's for a plurality of distributed participants and modalities such as webRTC, PSTN, radio, and proprietary protocols is difficult. In one embodiment, the proposed solution dynamically routes calls to enable resilience from the many ways in which one or several failures might occur.

Based on a plurality of signals including, but not limited to: indication by the user via a button or similar affordance in a computer user interface, failure to connect as indicated by internal system detection or as indicated by the caller, the system may re-direct the failing caller(s) to an alternative communication CP. The order of the vendor search (e.g., alternative communication CP) may include historical reliability, cost, latency, specified preference of the caller, specified preference of the provider (e.g., doctor, nurse, or office manager) in the telehealth system.

Determination of an acceptable CP for the failing participant, may utilize real time indications from the CP, an indication by the participant, or a test initiated by the telehealth system. Upon such an acceptance measure, the telehealth system may indicate to other participant(s) switching to a new communications provider where another participant is located. If such an interactive indication is presented, one or several participants may/or may not be able to prevent switching to the new communications provider and the newly established call. According to these policies and the optional feedback from the other participants, participants may leave their current call and join the call by the wandering caller.

Referring to FIG. 1A, there is shown a system diagram of a communication channel server system 100, in some implementations.

Telecommunication application hosting server 106 (or also referred to herein as application hosting server 106) may host communications between a plurality of different user devices over a data network to allow users of such devices to engage in real-time communications. For ease of reference, the plurality of different user devices will be described herein using a first user device 102 and a second user device 104. Examples of communications may include modalities such as telephony, video, push-to-talk, voice-over-IP, among others. Examples of data networks include personal area networks, local area networks, internet protocol networks public data networks or any other type of network that provides for telecommunications and/or video communications between devices. Examples of user devices include personal computers and mobile devices, among others.

To facilitate communications between users, application hosting server 106 may host a communication application (e.g., telehealth application) accessible by the first user device 102 and the second user device 104. The communication application may include one or more user interfaces to improve ease-of-use of the communication application for the users. The users may each log into the communication application via the respective user devices 102, 104 and then connect to a communication channel provided by the application hosting server 106 to engage in real-time communications.

In some embodiments, application hosting server 106 may host communication channels to its users using a plurality of disparate RTC communication channel providers. Each RTC communication CP may be configured to provide independent videotelephone, telephony and online chat services through a cloud-based peer-to-peer software platform used for telecommunications. Examples of communication providers include ZOOM, WEBEX, BLUEJEANS, TEAMS, among others.

Each RTC communication CP may each have a CP real-time database (not-shown). CP real-time databases may include a real-time indexed vendor table which may provide a unique call identification (ID) for each call made using the first communication CP 108 and second communication CP 110. CP real-time databases may also identify unique user identifications (UUID's) and status for each participant. There may be real-time backend support for registering and reading unique call ID's scoped to the CP customer's particular service, and their caller's UUID. When a call is set up, there may be a real-time tracking of UUID's in the call and if the caller leaves the call, the caller's UUID may be removed from the call ID's record.

Application hosting server 106 may also include a telephony database 112 (also referred to herein as a telehealth database 112). Telephony database 112 may provide further data on links 114, calls 116 and preferred CP order 118. Links 114 may provide data on email links sent to a plurality of users (e.g., first user device 102 and second user device 104) attempting to connect to a web-based RTC hosted by application hosting server 106. For example, first user device 102 may receive a unique email link indicated by "LINK 1" to make a call indicated by "Call 1" to a first communication channel of the first communication CP 108. LINK 1 and Call 1 may be associated with first user device, indicated by "UUID 1". That is to say, UUID 1 may be the unique user identification ID for first user device 102. Similarly, Link 1 and call 2 may be associated with the second user device, indicated by "UUID 1". That is to say, UUID 1 may be a unique user identification ID for the second user device 104. Calls 116 may provide data on calls made by individual users. For example, call ID1 may be a call ID log for a first user device 102, which may be indicated by "Call ID 1" in calls 116. Call ID2 may be a call ID log for second user device 104, which may be indicated by "Call ID 2". Preferred CP order 118 may be a configurable ordered list of RTC communication CP (also referred to herein as "webRTC providers") that are used by the application hosting server 106 to provide communication services to user devices 102, 104. The application hosting server 106 may sequentially attempt to utilize each webRTC provider, in order, to create suitable communication channels for the users. The ordered list of webRTC providers is generated based on metrics described herein.

Figure 1B:
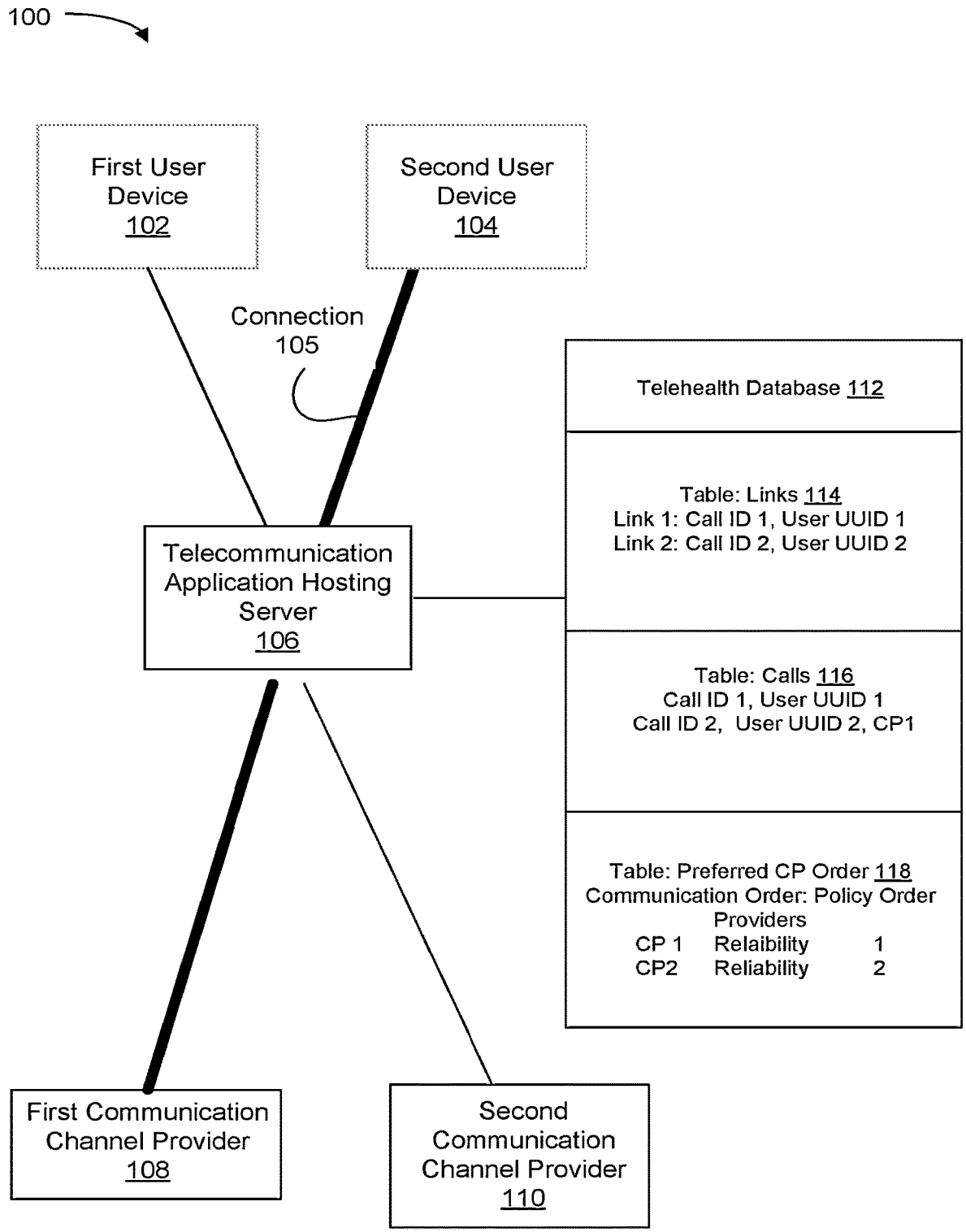
FIGS. 1B-1D is a communication channel system diagram depicting a failover operation, in accordance with some implementations.
Figure 1C:
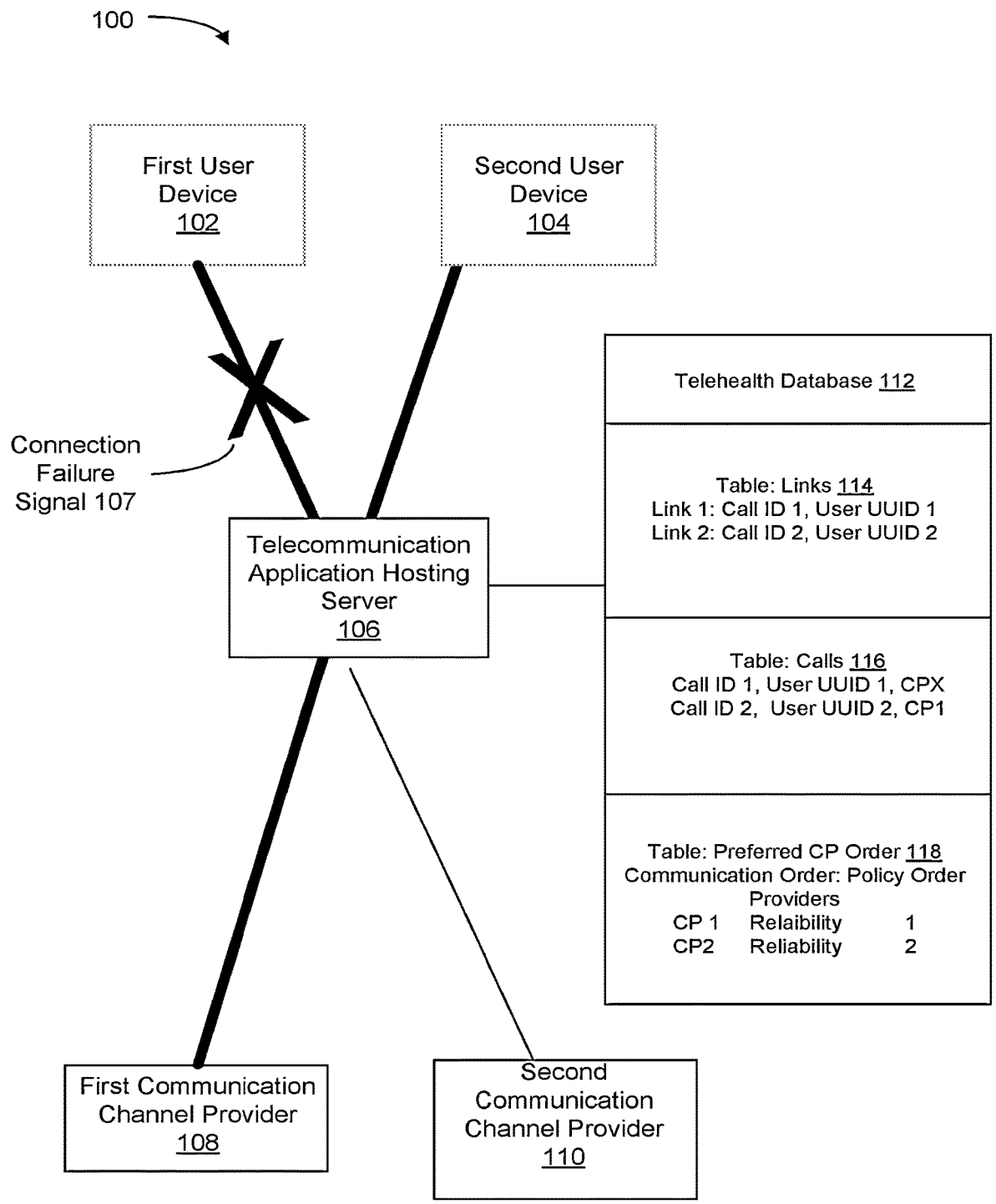
Figure 1D:
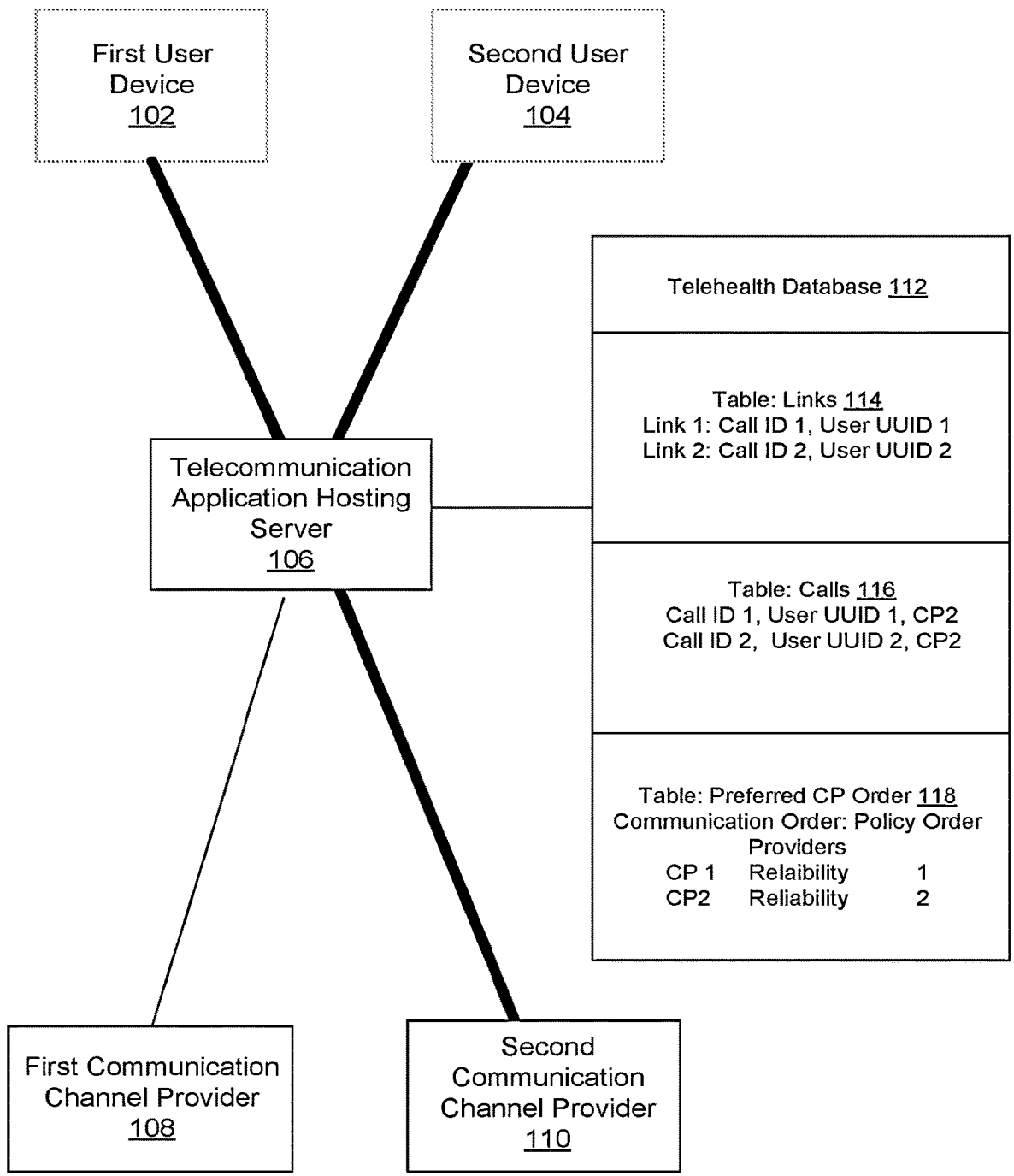

FIGS. 1B-1D depict a failover procedure using the system 100 of FIG. 1A, in accordance with some embodiments. Referring to FIG. 1B, application hosting server 106 may host a communication application between second user device 104. In one embodiment, application hosting server 106 may send a unique link (e.g., Link 2) from telehealth database 112 to the second user device 104. Link 2 may have a unique Call ID (e.g., Call ID 2) associated with a user UUID (e.g., User UUID 2). As such, application hosting server 106 may track the status of each user and user device associated with each activated link. For example, the second user device 104 may receive a unique link from links 114 sent from telephone database 112 in the format of an email. When the second user of second user device 104 activates unique link (e.g., Link 2 of table links 114), second user device 104 may connect to the first communication CP 108.

Application hosting server 106 may determine the second user device 104 connected to the first communication channel in various ways. For example, application hosting server 106 may receive a signal from telehealth database calls 116 table may associated Call ID 2, User UUID 2, CP 1 as a successful connection. In another example, application hosting server 106 may receive a signal from connection 105 recognizing application hosting server 106 hosting a successful connection of second user device 104 to a first communication channel of the first communication CP 108 (this may be further indicated by bolded line of connection 105).

In some embodiments, callers may select preferred communications providers for their communication sessions. In some embodiments, application hosting server 106 may select preferred communications providers for the communication sessions using the preferred CP order 118 as specified in the telehealth database 112.

It is contemplated that the first communication channel is provided by a first communication CP 108, but in some embodiments, the first communication CP 108 is one of a plurality of disparate communication channel providers, each capable of providing independent communications services hosted by the application hosting server 106.

FIG. 1C depicts a first users failure to connect to the first communication channel provider 108. In one embodiment, first user 102 may receive a unique link from links 114 sent from telehealth database 112. When first user of first user device 102 activates the unique link, first user device 102 may receive a connection failure signal 107 (also referred to herein as a "failure to connect signal") represented by the "X" in FIG. 1C. The connection failure signal 107 indicates that the first user device 102 failed to connect to the channel provided via first communication provider 108. Application hosting server 106 may receive connection failure signal 107 from the first user of the first user device 102.

The connection failure signal 107 may be detected by the communication application hosting server 106 by referencing call log 116 for the first user device 102 (e.g., call log 116, Call ID 1, User UUID 1, CP X), wherein the connection failure signal 107 is transmitted by the first user device.

In response to application hosting server 106 receiving (or detecting) the connection failure signal 107, application hosting server will determine whether a second communication channel provided by a second communication CP (e.g., second communication CP 110) of the plurality of disparate communication channel providers meets a failover criteria.

The failover criteria may include at least one of: a historical reliability metric, a cost metric, a latency metric, a specified preference user metric and a specified preference provider metric. The metrics described herein are used by the application hosting server 106 to determine the preferred CP order 118.

A number of different metrics described herein may be used to order the list of RTC communication CP.

In the case of the PSTN, the original call could dial out to the wondering user and connect them back into the call using the PSTN. That may mean the other callers, presumably with a stable or suitable connection can stay in the original call while the problematic caller searches for a successful connection.

In some cases, application hosting server 106 and/or callers using user devices 102, 104 may search or "hunt" for different communication providers with suitable communication channels. By using this type of hunting mechanism, the callers and the application hosting server 106 can search for communications providers that benefit from less burdened edge or other computing/network resources.

The ordered list of communications providers (e.g., preferred CP order 118) could further be adjusted dynamically based on pricing and quality constraints. These constraints could further change depending on the packaging of a telehealth system (i.e. did the buyer pay more for high quality service, or do they wish for the telehealth system to find the cheapest communications service on their behalf).

Application hosting server 106 may determine that the second communication channel provided by the second communication CP 110 meets the failover criteria, the application hosting server 106 may redirect the first user device 102 and the second user device 104 to second communication channel provided by the second communication CP 110, as depicted in FIG. 1D. In some embodiments, once the application hosting server 106 detects (and/or confirms) that a caller (e.g., first user device 102 and/or second user device 104) has successfully joined the other communication CP session, using the data from the real-time query, the application hosting server 106 could then drop and rejoin all the other callers automatically from the first communications provider connecting to the second. This drop and rejoin process could occur as a cascade of attempts using different communication providers. For example, the application hosting server 106 may try the second, third and so on communication providers of the plurality of communications providers for successful connection, or even try to connect to the PSTN. The application hosting server 106 would then redirect the other callers after a successful connection of the first caller.

In some embodiments, successfully connecting to the second communication CP 110 (or any other disparate communication channel) may be indicated by receiving at least one of a real time indication from the second communication CP 110, an acceptance indication from the first user device 102 and/or a successful connection test initiated by the communication application hosting server 106. Similarly, application hosting server 106 may connect the second user device 104 to the second communication channel of the second communication CP 110.

Figure 2:
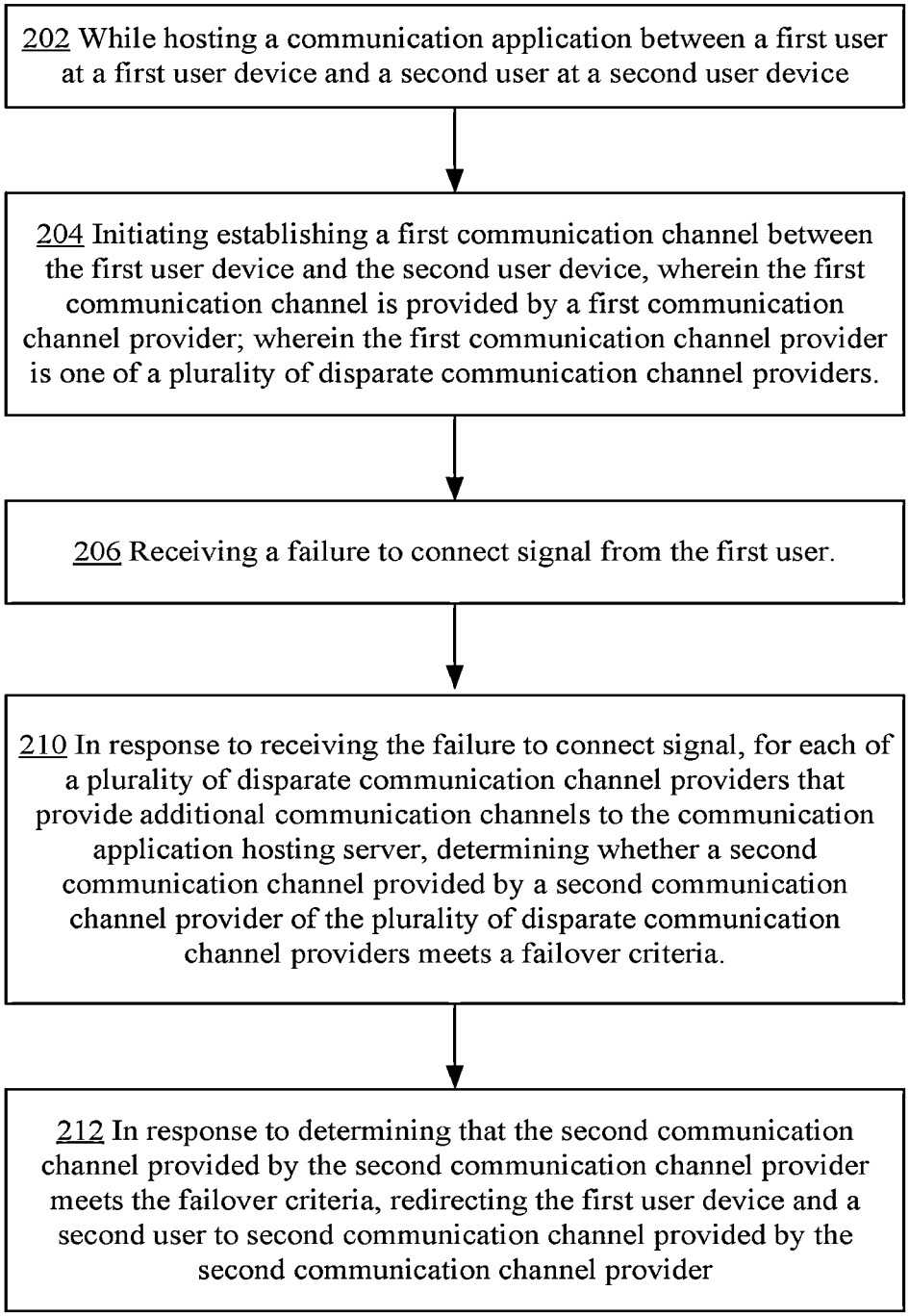
FIG. 2 is a flow chart of the communication provider hunting method, in accordance with some implementations.

FIG. 2 is a flow chart of the communication channel failover between disparate communication providers, in some implementations. In some embodiments, the application hosting server 106 may perform one or more steps of the method 200, but it is contemplated that in other embodiments, other components may perform one or more steps of the method 200.

While hosting (202) a communication application between a first user at a first user device 102 and a second user at a second user device 104, application hosting server 106 may perform the step of initiating (204) establishing a first communication channel between the first user device 102 and the second user device 104 provided by a first communication CP 108. An example of initiating establishing a first communication channel between the second user device 104 provided by the first communication CP 108 is shown in FIG. 1B.

In some embodiments, the first user device 102 has a unique first user identifier and the second user device 104 has a unique second user identifier. For example, first user device 102 may have unique first user identifier user UUID 1 and second user device 104 may have UUID 2, shown in telephony database 112 in FIGS. 1A-1D.

In some embodiments, the first user device 102 and the second user device 104 each have a unique connection identification for each communication channel. For example, first user device 102 may have connection identification "Call ID 1:" and second user identification may have connection identification "Call ID 2".

In some embodiments, application hosting server 106 may perform the step of receiving (206) a failure to connect signal from the first user (e.g., connection failure signal 107 of first user device 102 shown in FIG. 1C).

In some embodiments, the failure to connect signal is detected by the communication application hosting server 106 referencing a call log (e.g., Call ID 1) for the first user device 102, wherein the failure to connect signal (e.g., connection failure signal 107 of first user device 102 shown in FIG. 1C) is transmitted by the first user device 102. For example, calls 116 may be a call log including a call log "Call ID 1" for the first user device 102.

In some embodiments, the communication application hosting server 106 logs the failure to connect signal from the first user. For example, application hosting server 106 may log the connection failure signal 107.

In some embodiments, in response to receiving the failure to connect signal (e.g., connection failure signal 107), for each of a plurality of disparate communication channel providers that provide additional communication channels to the communication application hosting server 106, application hosting server 106 may perform the step of determining (210) whether a second communication channel provided by a second communication channel provider 110 of the plurality of disparate communication channel providers meets a failover criteria. In some embodiments, the failover criteria includes at least one of: a historical reliability metric, a cost metric, a latency metric, a specified preference user metric and a specified preference provider metric. A second communication channel may be selected that satisfies one or more metrics described herein or alternatively, is the most suitable in view of the one or more metrics.

In response to determining that the second communication channel provided by the second communication channel provider 110 meets the failover criteria, application hosting server 106 may perform the step of redirecting (212) the first user device 102 and the second user device 104 to second communication channel provided by the second communication channel provider 110.

In some embodiments, redirecting the first user device 102 and the second user to second communication channel provided by the second communication channel provider 110 includes: connecting the first user device 102 to the second communication channel by the communication application hosting server 106, confirming the first user device 102 successfully connects to the second communication channel by receiving at least one of a real time indication from the second communication channel, an acceptance indication from the first user device 102 and/or a successful connection test initiated by the communication application hosting server; and connecting the second user device 104 to the second communication channel by the communication application hosting server.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not necessarily the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A computer-implemented method of communication channel failover between disparate communication providers, the method comprising:
   at a communication application hosting server:
      while hosting a communication application between a first user at a first user device and a second user at a second user device:
         initiating establishing a first communication channel between the first user device and the second user device, wherein the first communication channel is provided by a first communication channel provider; wherein the first communication channel provider is one of a plurality of disparate communication channel providers;
      receiving a failure to connect signal from the first user;
      in response to receiving the failure to connect signal:
         for each of a plurality of disparate communication channel providers that provide additional communication channels to the communication application hosting server, determining whether a second communication channel provided by a second communication channel provider of the plurality of disparate communication channel providers meets a failover criteria;
      in response to determining that the second communication channel provided by the second communication channel provider meets the failover criteria, redirecting the first user device and the second user device to second communication channel provided by the second communication channel provider.

2. The computer-implemented method of claim 1, wherein redirecting the first user device and the second user device to the second communication channel provided by the second communication channel provider includes:
   connecting the first user device to the second communication channel by the communication application hosting server:
   confirming the first user device successfully connects to the second communication channel by receiving at least one of a real time indication from the second communication channel, an acceptance indication from the first user device, a successful connection test initiated by the communication application hosting server; and
   connecting the second user device to the second communication channel by the communication application hosting server.

3. The computer-implemented method of claim 1, wherein the failure to connect signal is detected by the communication application hosting server referencing a call log for the first user device, wherein the failure to connect signal is transmitted by the first user device.

4. The computer-implemented method of claim 1, wherein the failover criteria includes at least one of: a historical reliability metric, a cost metric, a latency metric, a specified preference user metric and a specified preference provider metric.

5. The computer implemented method of claim 1, wherein the first user device has a unique first user identifier and the second user device has a unique second user identifier.

6. The computer implemented method of claim 1, wherein the first user device and the second user device each have a unique connection identification for each communication channel.

7. The computer implemented method of claim 1, wherein the communication application hosting server logs the failure to connect signal from the first user.

8. A system for communication channel failover between disparate communication providers, comprising:
   one or more processors;
   memory; and
   one or more programs stored in the memory, wherein the one or more programs are configured for execution by the one or more processors and include instructions for:
      at a communication application hosting server:
         while hosting a communication application between a first user at a first user device and a second user at a second user device:
            initiating establishing a first communication channel between the first user device and the second user device, wherein the first communication channel is provided by a first communication channel provider; wherein the first communication channel provider is one of a plurality of disparate communication channel providers;
         receiving a failure to connect signal from the first user;
         in response to receiving the failure to connect signal:
            for each of a plurality of disparate communication channel providers that provide additional communication channels to the communication application hosting server, determining whether a second communication channel provided by a second communication channel provider of the plurality of disparate communication channel providers meets a failover criteria;
         in response to determining that the second communication channel provided by the second communication channel provider meets the failover criteria, redirecting the first user device and a second user to second communication channel provided by the second communication channel provider.

* * * * *